United States Patent
Wong et al.

(10) Patent No.: US 9,470,849 B2
(45) Date of Patent: Oct. 18, 2016

(54) CONNECTOR MOUNT PLATE FOR REDUCING RATTLING

(71) Applicant: SENKO Advanced Components (HK) Ltd., Hong Kong (HK)

(72) Inventors: Man Kit Joe Wong, Hong Kong (HK); Kim Man Wong, Hong Kong (HK)

(73) Assignee: SENKO Advanced Components (HK) Ltd. (HK)

( * ) Notice: Subject to any disclaimer, the term of this patent is extended or adjusted under 35 U.S.C. 154(b) by 0 days.

(21) Appl. No.: 14/594,185

(22) Filed: Jan. 12, 2015

(65) Prior Publication Data
US 2015/0234128 A1 Aug. 20, 2015

Related U.S. Application Data

(60) Provisional application No. 61/940,811, filed on Feb. 17, 2014.

(51) Int. Cl.
*G02B 6/00* (2006.01)
*G02B 6/36* (2006.01)
*G12B 9/00* (2006.01)
*G02B 6/38* (2006.01)

(52) U.S. Cl.
CPC ........... *G02B 6/3825* (2013.01); *G02B 6/3644* (2013.01); *G02B 6/3897* (2013.01)

(58) Field of Classification Search
CPC . G02B 6/3825; G02B 6/3632; G02B 6/3644
USPC ........... 385/53, 55, 134, 136; 248/27.1, 27.3
See application file for complete search history.

(56) References Cited

U.S. PATENT DOCUMENTS

| | | | |
|---|---|---|---|
| 5,545,061 A | 8/1996 | Sawayanagi | |
| 6,325,335 B1 * | 12/2001 | Harvey | G02B 6/3816 248/27.1 |
| 7,060,900 B1 | 6/2006 | Gretz | |
| 7,384,200 B2 * | 6/2008 | Nakagawa | G02B 6/3825 248/27.1 |
| 7,442,078 B1 | 10/2008 | Hsu | |
| 7,661,887 B2 * | 2/2010 | Nakagawa | G02B 6/4296 385/70 |
| 9,188,747 B2 * | 11/2015 | Gniadek | G02B 6/3825 |

FOREIGN PATENT DOCUMENTS

| | | |
|---|---|---|
| CN | 1428902 A | 7/2003 |
| CN | 101022193 A | 8/2007 |
| CN | 201075513 Y | 6/2008 |
| CN | 201466404 U | 5/2010 |
| CN | 201498765 U | 6/2010 |
| CN | 201515092 U | 6/2010 |

OTHER PUBLICATIONS

International Search Report mailed on May 6, 2015 for a related PCT application No. PCT/CN2015/073056.

* cited by examiner

*Primary Examiner* — Robert Tavlykaev
(74) *Attorney, Agent, or Firm* — Ella Cheong Hong Kong; Sam Y. Tip

(57) ABSTRACT

A mount plate for an optical adaptor includes two bases bridged by a bar and a locking claw stemming out of each of the two bases. Each of the two bases has a folded structure erected at the back end of the base to fill up the gap between the optical adaptor and the hole of the panel and to reduce rattling. Supporting tips are provided at the base of the folded structure to support the folded structure and to keep the base securely attached to the optical adaptor.

19 Claims, 15 Drawing Sheets

-- Prior Art --

CONNECTOR MOUNT PLATE FOR REDUCING RATTLING

CLAIM FOR DOMESTIC PRIORITY

This application claims priority under 35 U.S.C. §119 to the U.S. Provisional Patent Application No. 61/940,811 filed Feb. 17, 2014, the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to optical or electrical/electronic connector-adaptors including, but not limited to, LC, SC, simplex, and duplex types optical adaptors. Particularly, the present invention relates to the mount plates installed on the housings of such adaptors.

BACKGROUND

FIG. 1 shows a housing of an optical adaptor of SC simplex type with a traditional mount plate installed on the housing and a connector a connector panel which the optical adaptor is to be secured on. Also shown on FIG. 1 is a connector panel 100. The thickness of the connector panel 100 and the dimension of the connection holes are set according to industry standards.

There is a size known as "SC footprint" which is widely used for the housing of a range of optical adaptors including LC, SC of simplex, duplex and other types of optical adaptors. "SC footprint" size of housing is used as a non-limiting example throughout the application to illustrate the present invention.

As an illustrating example, the connector panel 100 has a thickness of a standard wall thickness. The connector panel 100 has at least one hole 103 with a dimension of width 101 by height 102. The optical adaptor, being represented by its housing 110, is plugged through the hole 103 and is secured on the connector panel 100. Although internal components or designs within the optical adaptor 110 may be different among different types of adaptors or connectors, the configuration of the mount plate 120 and the dimension of the optical adaptor 110 (i.e. adaptor housing) is adaptable or adjustable to accommodate the variation to allow interoperability with standard connector panels without loss of the spirit of the present invention.

As shown in FIG. 1, the mount plate 120 is provided on an adaptor or a connector 110 so that the mount plate 120 secures the optical adaptor 110 onto the connector panel 100 after the mount plate 120 is inserted through the hole 103 the connector panel 100.

FIG. 2 shows an enlarged view of the housing of the SC simplex type optical adaptor without the mount plate and a traditional mount plate separated from the housing.

The housing 110 of an optical adaptor has a placement region 200 for the mount plate 120. The mount plate 120 is snapped onto the placement region 200 and is secured thereon.

The mount plates 120 are shown in FIG. 2 in a normal position view 250 and an upside down view 260. The locking claws 230 are provided on the opposite sides of the mount plate 120. Being fitted into a hole of the connector panel, the locking claws 230 are deformed to get through the hole and restore to an initial position to hold onto the connector panel after getting through the hole. To unlock or release the optical adaptor from the connector panel, the locking claws 230 need to be pressed so that they are flattened onto the optical adaptor to allow the optical adaptor to get through the hole of the connector panel.

FIG. 3 shows the cross-sectional views of the SC simplex type optical adaptor with the traditional mount plate installed on its housing standalone and when connected to the connector panel. The upper view 310 shows the locking claws 230 extends from the mount plate which is fitted on the housing 100 of the optical adaptor. From the lower view 320, it can be seen that the optical adaptor is secured in the hole of the connector panel 100 by the locking claws 230 of the mount plate on the housing 110 of the optical adaptor after the locking claws 230 get through the hole of the connector panel 100.

FIG. 4 shows the progressing cross-sectional views of the SC simplex type optical adaptor with the traditional mount plate installed on its housing being inserted into the connector panel hole.

It can be seen that the locking claws 230 of the mount plate on the housing 110 deforms when being inserted through the hole of the connector panel 100 to get through the hole. The hole of the connector panel 100 flattens and squeezes the locking claws 230. Owing to their resilience, the locking claws 230 have their shape restored from the flattened state back to the initial state after getting through the hole. The open ends of the lock claws 230 are then stand against the connector panel 100 such that the locking claws 230 of the mount plate prevent the optical adaptor from retreating from the hole of the connector panel 100.

FIG. 5 shows the enlarged cross-sectional views of the SC simplex type optical adaptor with the traditional mount plate installed on its housing secured in the connector panel hole.

As shown, there is a significant clearance space 510 between the edge of the hole of the connector panel 100 and the periphery of the adaptor housing 110. This clearance space 510 is necessary for the insertion of the optical adaptor 110 into the connector panel hole. Without this clearance 510, the locking claws 230 of the mount plate 120 even when compressed cannot be cleared to pass through the connector panel hole during insertion. However, precisely because of this clearance 510, rattling of the adaptor housing 110 occurs when the optical adaptor stays inserted in the connector panel hole. This rattling can cause transmitted signal degradations and losses in the connection interface and the problem is more profound with optical signal.

A number of solutions have been proposed to prevent an optical adaptor from wobbling when mounted on a panel through a mount hole thereof. For example, Japanese Utility Model Registration No. 3111711 describes an optical adaptor mounting metal fitting (hereinafter referred to as "Japan Fitting"). That optical adaptor mounting metal fitting has a curved engagement, which is used to secure the optical adaptor to the panel by means of small elastic deformation of the curved engagement. However, the curved engagement appears to have a rather small elastic deformation capacity, yielding insufficient spring elasticity.

Thus, in the case where the mounting hole is too small, the curved engagement of the Japan Fitting cannot be deformed and flattened so that it obstructs the optical adaptor from being inserted completely into the mounting and securely fastened. On the other hand, where the mounting hole is too large, the curved engagement is not elastically engaged with the inner surface of the mounting hole and fails to prevent wobbling of the optical adapter.

In another example, U.S. Pat. No. 7,384,200 discloses another type of mounting metal fitting that prevents an optical adaptor from wobbling after mount, which is shown in FIG. 6. FIG. 6 shows a perspective view of an optical adaptor with the optical adaptor mounting metal fitting and a perspective view of the optical adaptor mounting metal fitting.

The optical adaptor 600 is a duplex type. The mounting metal fitting 601 has a pair of elastic click engagements 630. It further has a pair of facing side plates extending from either side of a joining plate 620. Each side plate has a first side plate piece 610 at an end adjacent to the joining plate 620 and a second side plate piece 611 at a distal end from the joining plate 620. The first side plate piece 610 provides a rectangular second elastic engagement 612 and the second side plate piece 611 provides a first elastic engagement 613. The rectangular second elastic engagement 612 obliquely extends from a front end of the first side plate piece 610 away from the joining plate and the optical adaptor. The first elastic engagement 613 obliquely extends from a front end of the second side plate piece 611 toward the joining plate 620 and the optical adaptor 600. Hence each side plate has its front end lifted away from the optical adaptor 600 and the fastening of the mounting metal fitting 601 onto the optical adapter 600 is significantly weaken when only the tips 613a are left to be in contact with the optical adaptor 600 at that front end. The stability of the optical adaptor 600 mounted in the hole is too low to be satisfactory.

Furthermore, rattling may also be caused by loosening of the mount plate 120 from the optical adaptor 110. Owing to fatigue of mechanical parts, the mount plate 120 gets loose and the optical adaptor can no longer be fastened to the connector panel 100. Therefore, it is desirable to have a mount plate 120 which can not only fill up the space between the connector panel hole and the optical adaptor but also remain fastened to the optical adaptor 110.

SUMMARY OF THE INVENTION

An object of the present invention is to provide a mount plate for an optical adaptor to be securely fitted into the hole of a connector panel and free from any rattling or wobbling, regardless of how loose or how tight the hole of the connector panel is for the mount plate and for the optical adaptor.

A further object of the present invention is to provide a mount plate, which is securely mounted on the optical adaptor.

To ensure that the mount plate of the present invention does not obstruct the insertion of the optical adaptor into the hole of a connector panel, the rattle-free feature is provided as a flat plate with a slope for sliding against the hole of a connector panel. In the present invention, the rattle-free feature can be the corner of the back end of the base of the mount plate, or the back end of the base of the mount plate, or the tab at the corner of the back end of the mount plate. Unlike the conventional mounting metal fittings of the Japan Fitting, which provide a step that is sized to fill the gap between the optical adaptor and the hole of a panel, the rattle-free features of the present invention provide a slope with its peak sized to fill the gap between the optical adaptor and the hole of a connector panel at the end of the mount plate. Therefore, the hole of the connector panel is sleeved onto the mount plate along a slope and this facilitates the optical adaptor to be plugged into the hole of the connector panel. Since the thickest part of the optical adaptor is at the very end of the mount plate, the mount plate of the present invention is less obstructing than the conventional mounting metal fittings.

In addition, the present invention is to ensure that the mount plate of the present invention is attached to the optical adaptor securely so that the mount plate is prevented from loosening off the optical adaptor nor ausing any rattling or wobbling to the optical adaptor, it is important to ensure sufficient contact area between the optical adaptor and the mount plate. Firstly, both the upper part and the lower part of the base of the mount plate remain attached to the optical adaptor once the mount plate is fitted onto the optical adaptor. Secondly, the present invention provides a pair of supporting tips to grip onto the optical adaptor when the gripping force is provided by the rattle-free features when they fill up the gap between the optical adaptor and the hole of the panel. Thirdly, the present invention further provides a clamping plate at the back end of the mount plate. The clamping plate provides support to the rattle-free features so that deformation or dislocation of the rattle-free feature is less likely. The clamping plate can be the middle part of the back end of the base of the mount plate joining the upper and lower rattle-free features together. In an embodiment, the clamping plate holds onto the optical adaptor so that it provides a balancing force to withstand any lateral movement or torsion to the bases of the mount plate.

One embodiment of the present invention provides a mount plate for an optical adaptor, including a first base and a second base which are bridged by a bar; a locking claw stemming out of the middle section of each of the first base and the second base such that each locking claw has one end connected with the respective base thereof and another end being an opening end; at least two supporting tips extending in a direction towards the opening end of the locking claw from each of the first base and the second base beyond the intersection between the bar and each of the first base and the second base; and a rattle-free feature pointing away from the bar erected at each of the supporting tips such that the rattle-free feature forms an acute angle with the respective supporting tip thereof, wherein the rattle-free feature is a piece of flat plate.

The mount plate further includes a clamping plate joining more than one rattle-free features and providing a stand for each of the rattle-free features such that the clamping plate is pressed by the rattle-free feature when the rattle-free feature is pressed. When one or more rattle-free features transfer any force acting thereon to clip the optical adaptor. The supporting tip extends beyond the said intersection by a length of at least 0.5 mm. The rattle-free feature is in shape of a triangle using the hypotenuse thereof to erect on the supporting tip. The acute angle is 24°. The clamping plate has a minimum length of 1.51 mm-1.53 mm for joining the two rattle-free features.

A second embodiment of the present invention provides a mount plate for an optical adaptor, including a first base and a second base which are bridged by a bar; a locking claw stemming out of the middle section of each of the first base and the second base such that each locking claw has one end connected with the respective base thereof and another end being an opening end; at least two supporting tips extending in a direction towards the opening end of the locking claw from each of the first base and the second base beyond the intersection between the bar and each of the first base and the second base; and a rattle-free feature pointing away from the bar erected at each of the supporting tips such that the rattle-free feature forms an acute angle with the respective supporting tip thereof, wherein the rattle-free feature is a piece of flat plate.

The mount plate further includes a clamping plate joining more than one rattle-free features and providing a stand for each of the rattle-free features such that the clamping plate is pressed by the rattle-free feature when the rattle-free feature is pressed. The supporting tip extends beyond the said intersection by a length of at least 1.44 mm. The rattle-free feature is in shape of a rectangular plate using one end thereof to erect on the supporting tip. The acute angle is 31°. The clamping plate has a minimum length of 2.48 mm for joining the two rattle-free features.

A third embodiment of the present invention provides a mount plate for an optical adaptor, including a first base and a second base which are bridged by a bar; a locking claw stemming out of the middle section of each of the first base and the second base such that each locking claw has one end connected with the respective base thereof and another end being an opening end; at least two supporting tips extending in a direction towards the opening end of the locking claw from each of the first base and the second base beyond the intersection between the bar and each of the first base and the second base; and a rattle-free feature pointing away from the bar erected at each of the supporting tips such that the rattle-free feature forms an acute angle with the respective supporting tip thereof, wherein the rattle-free feature is a piece of flat plate. The supporting tip extends beyond the said intersection by a length of at least 1.03 mm. The rattle-free feature is in shape of a rectangular plate with one end joining two of the supporting tips. The acute angle is 21°. The first base and the second base extend in a direction towards each other such that the angle between the bar and each of the first base and the second base is 88.5° respectively.

Another object of the present invention is to provide an optical adaptor with the mount plate of any of the above embodiments so that the mount plate installed onto a placement region of the housing of the optical adaptor.

A further object of the present invention is to provide a mount plate with the first base and the second base extending in a direction towards each other such that the angle between the bar and each of the first base and the second base is 88.5° respectively.

BRIEF DESCRIPTION OF DRAWINGS

Embodiments of the invention are described in more detail hereinafter with reference to the drawings, in which:

FIG. 1 shows a housing of an optical adaptor of SC simplex type with a traditional mount plate installed on the housing and a connector a connector panel which the optical adaptor is to be secured on;

DETAILED DESCRIPTION

In the following description, apparatuses and systems of connector mount plate and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

To solve the aforementioned problem with the traditional adaptor mount plates, the present invention provides three novel designs of mount plates as described below.

In accordance to the various embodiments of the present invention, a rattle-free mount plate is to add a "fold-up" feature to the sides of the mount plate near the end part of the mount plate. The sides of the mount plate are compressed to deform when being inserted into the panel hole, filling up clearance, and giving reaction force to the panel thickness.

Metallic material such as stainless steel may be used to manufacture the mount plate. The material in use of manufacture of the mount plate according to the present invention is compliant with RoHS (Restriction of Hazardous Substances) and SVHC (Substances of Very High Concern) under the REACH Regulation. It is also possible that plastic materials are used. The mount plate is received or placed or secured on the placement region of the housing of the optical adaptor.

In the preferred embodiments, stainless steel (SUS301) is used to make the mount plate.

The dimensions provided hereinafter are exemplary according to an embodiment of the present invention. Without loss of generality, variations in dimensions are also applicable to the present invention.

For illustrative purposes, only the adaptor housing is shown rather than showing the whole optical adaptor containing the internal components. Nevertheless, it is understood that the present invention functions and operates in the same way for the optical adaptor as shown in the case of the adaptor housing. Therefore, the words "adaptor housing" and "optical adaptor" are used interchangeably hereinafter.

Figure 1:
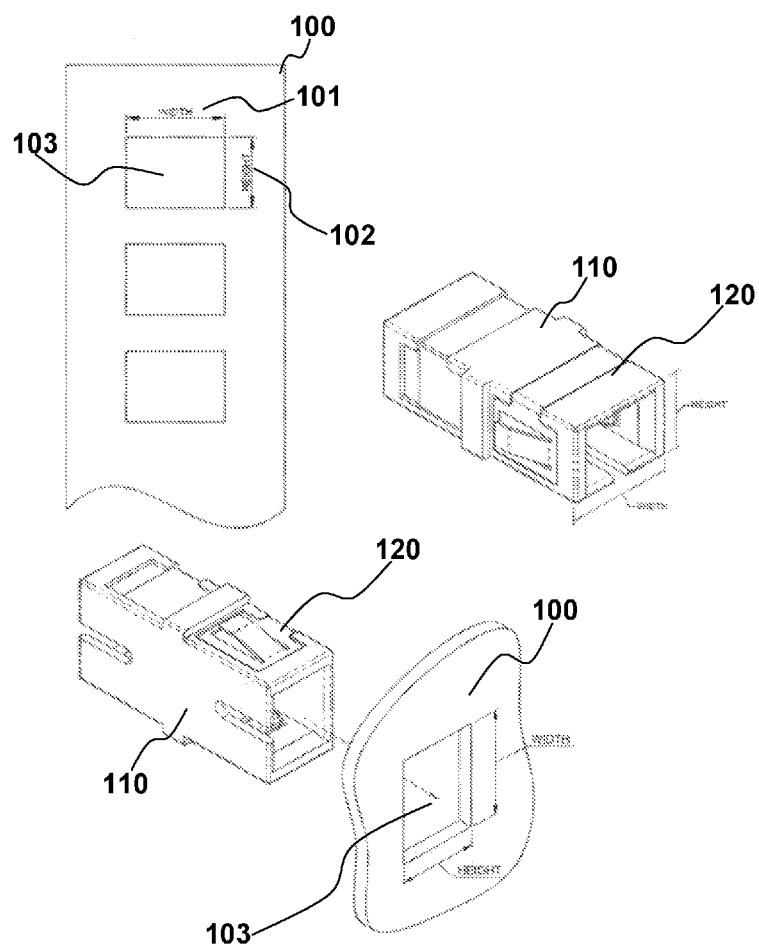
Figure 2:
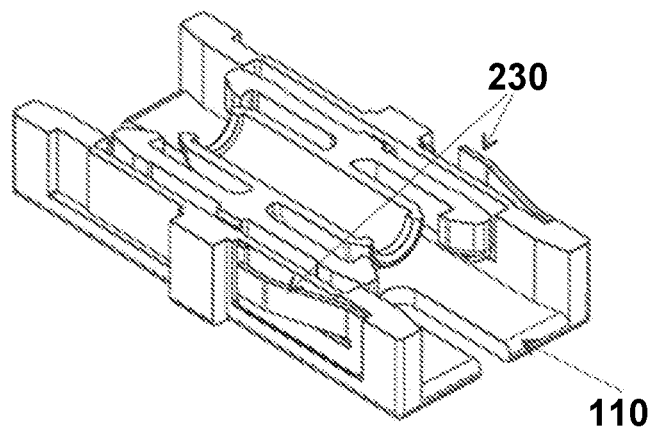
FIG. 2 shows an enlarged view of the housing of the SC simplex type optical adaptor without the mount plate and a traditional mount plate separated from the housing.
Figure 2:
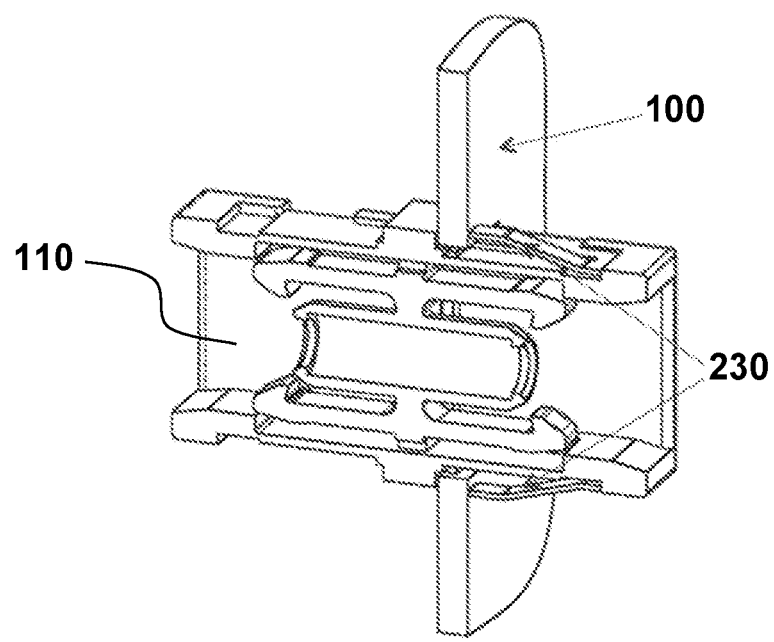
Figure 3:
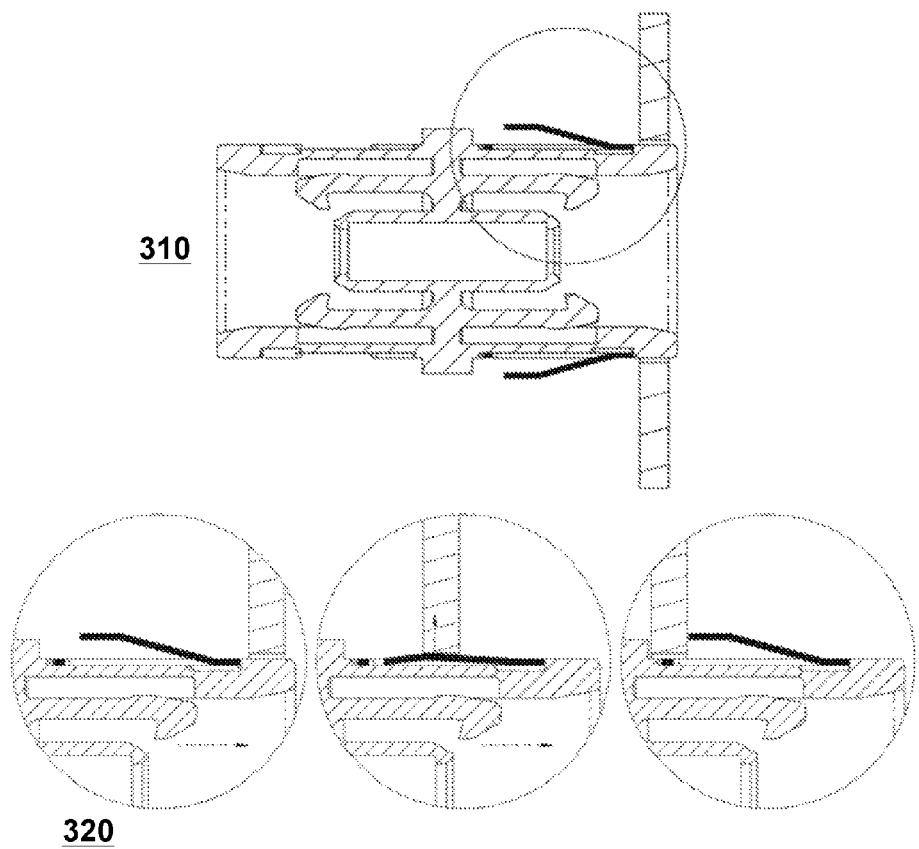
FIG. 3 shows the cross-sectional views of the SC simplex type optical adaptor with the traditional mount plate installed on its housing standalone and when connected to the connector panel.
Figure 4:
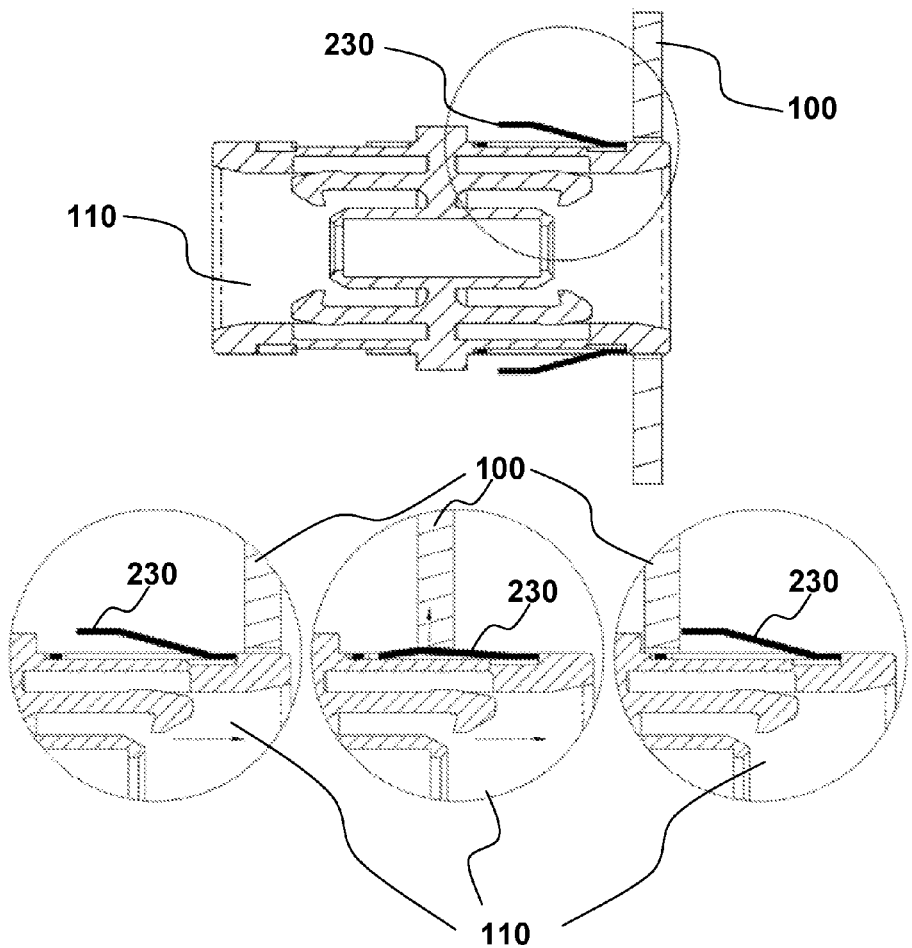
FIG. 4 shows the progressing cross-sectional views of the SC simplex type optical adaptor with the traditional mount plate installed on its housing being inserted into the connector panel hole.
Figure 5:
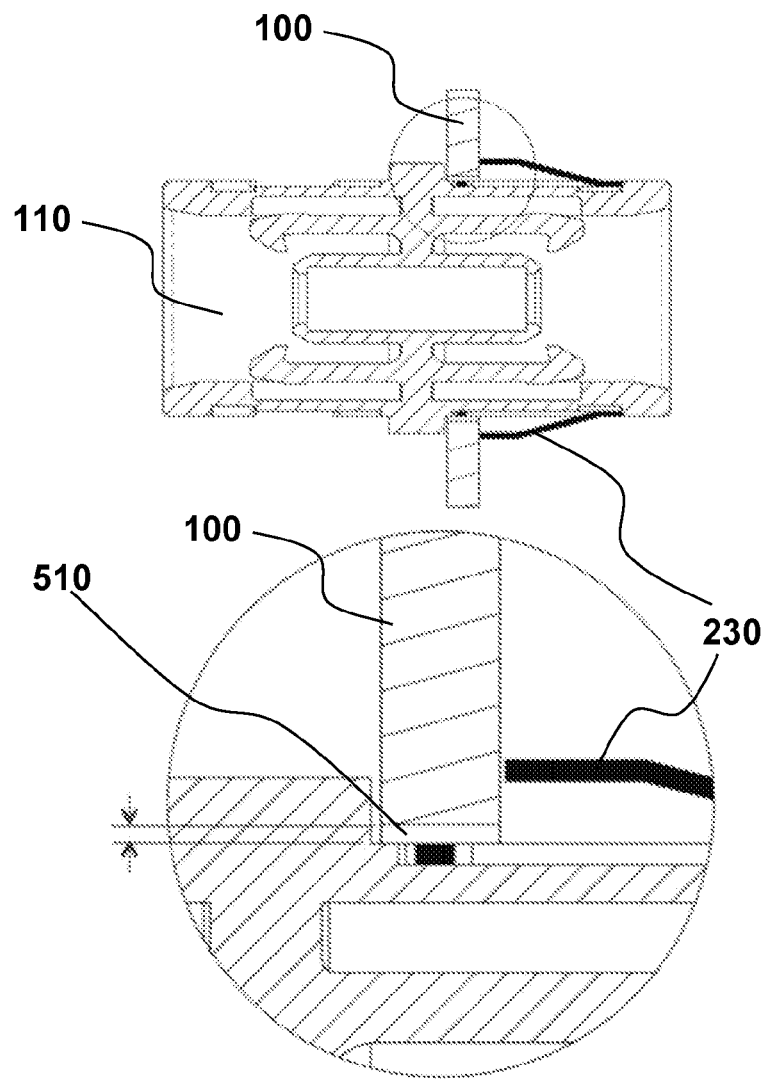
FIG. 5 shows the enlarged cross-sectional views of the SC simplex type optical adaptor with the traditional mount plate installed on its housing secured in the connector panel hole.
Figure 6:
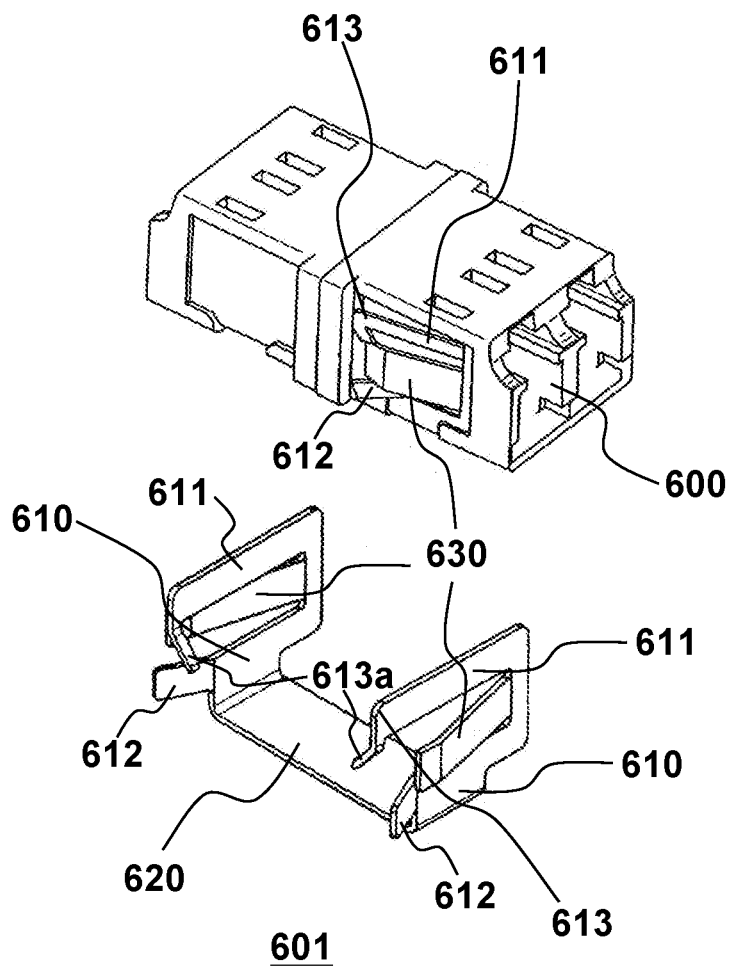
FIG. 6 shows a perspective view of an optical adaptor with the optical adaptor mounting metal fitting and a perspective view of the optical adaptor mounting metal fitting.
Figure 7:
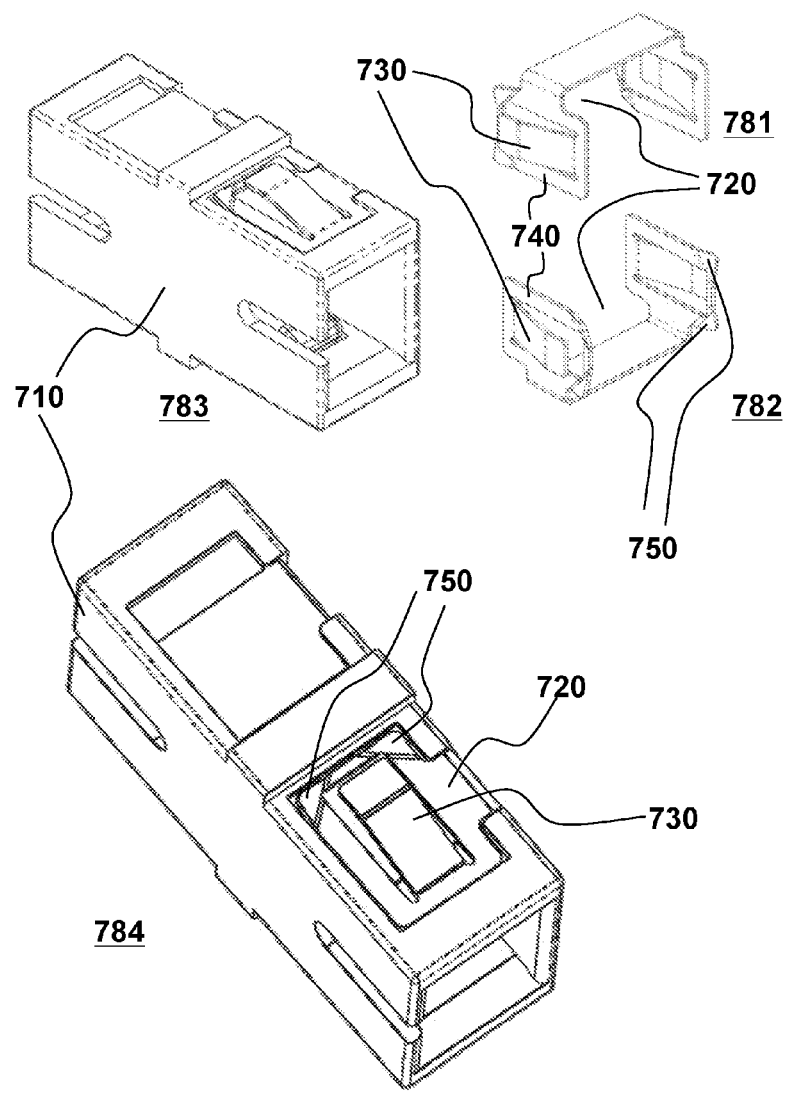
FIG. 7 shows a perspective view of a mount plate according to a first embodiment of the present invention before and after it is mounted on an optical adaptor.

FIG. 7 shows a perspective view of a mount plate according to a first embodiment of the present invention before and after it is mounted on an optical adaptor. The mount plate 720 of the first embodiment is shown in a normal position view 781 and an upside down view 782.

The mount plate 720 has a base 740 on each side. Each base 740 has a locking claw 730 protruding from the base 740 out of the mount plate 720. The two corners 750 of the base 740 that are closer to the opening end of the locking claw 730 are folded slightly upward away from the optical adaptor 710.

When mounted on the adapter housing 710 as shown in the perspective views 783 and 784, the mount plate 720 is received by the optical adapter 710 at the placement region of the adaptor housing 710.

Figure 8:
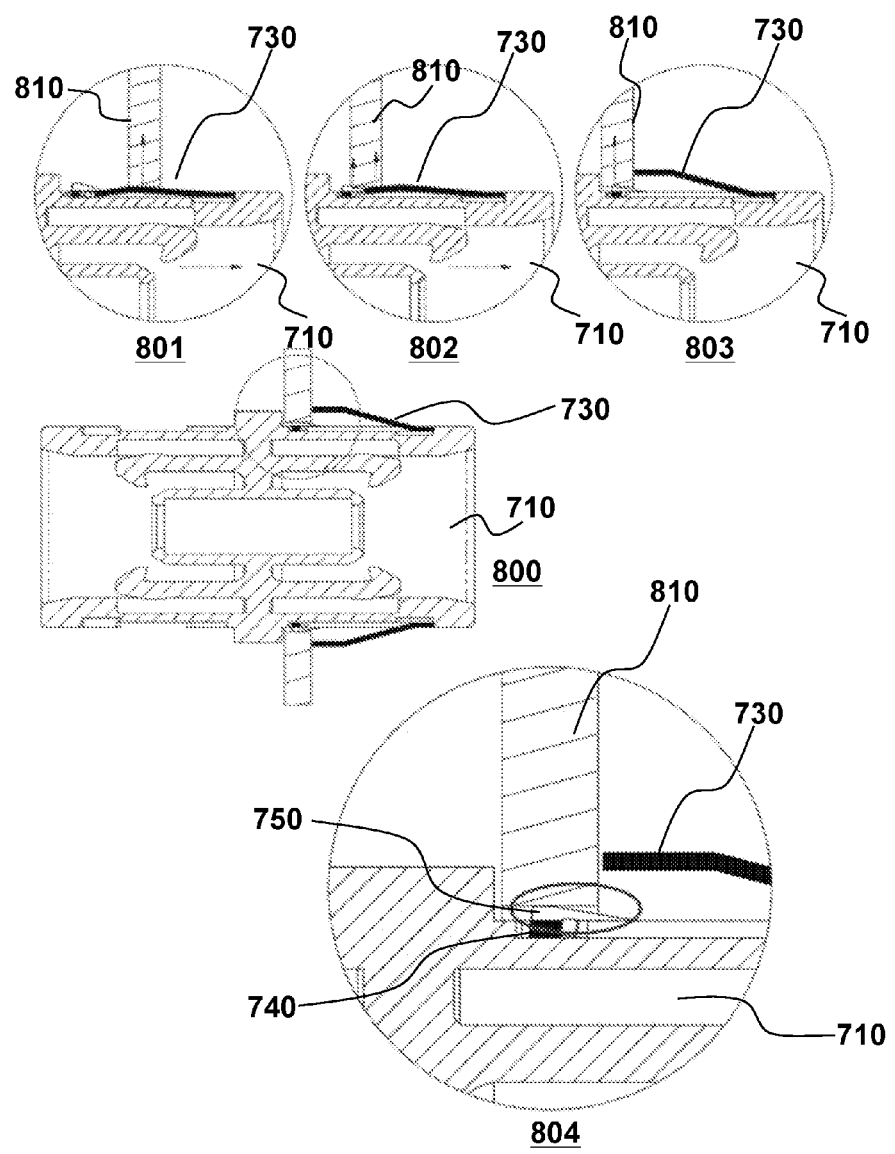
FIG. 8 shows a cross-sectional view of an optical adaptor being inserted into the hole of a panel.

FIG. 8 shows a cross-sectional view of an optical adaptor being inserted into the hole of a connector panel according to the first embodiment of the present invention. The cross-sectional view 800 shows the adaptor housing 710 is fully inserted into the hole on the connector panel 810. In order to illustrate how the mount plate 720 operates, the region around the hole of the connector panel 810 is enlarged to better show the insertion of the adaptor housing 710 into the hole on the connector panel 810 at different time instances.

The enlarged cross-sectional views 801, 802, and 803 show the adaptor housing 710 is progressing through the connector panel hole. The locking claw 730 is flattened onto the adaptor housing 710 by the wall of the connector panel hole when the adaptor housing 710 is passing through the connector panel hole. After the adaptor housing 710 is fully inserted as shown by the enlarged cross-sectional view 803, the locking claw 730 has its opening end out of the wall of the connector panel hole and the opening end of the locking claw 730 returns to its initial floating position under its resilience force.

In the enlarged cross-sectional view 804, it is shown that the adaptor housing 710 has been fully inserted into the connector panel hole. As shown by the enlarged cross-sectional view 804, the whole locking claw 703 passes through the connector adaptor thickness 810. The two folded corners 750 of the first embodiment of the mount plate 720 are pressed against the wall of the connector panel hole at the edge of the connector panel hole to fill the clearance, thus eliminating any rattling.

In the meantime, a part of the base 740 remains leaning against the adaptor housing 710 to hold the adaptor housing 710 and provide additional support to the two folded corners 750 when they are pressing against the wall of the connector panel hole.

The advantages of this first embodiment of the mount plate 720 include:

(1) the pressure points on the wall of the connector panel hole at the edge of the connector panel hole are near the corners of the hole, thus the reaction force pressing on the wall of the connector panel hole at the edge of the connector panel hole is evenly distributed;

(2) the creases of the folded corners 750 occupy a relatively large area of the base 740; this facilitates relatively high resilience of the folding, which translate to a stronger reaction force; and (3) the folded corners 750 of the base 740 can fill up the clearance near corner of the connector panel hole. This allows the folded corners 750 to provide a more even distribution of reaction force to the wall of the connector panel hole at the corner regions and to offer higher stability for functioning as a rattle-free feature.

Figure 9:
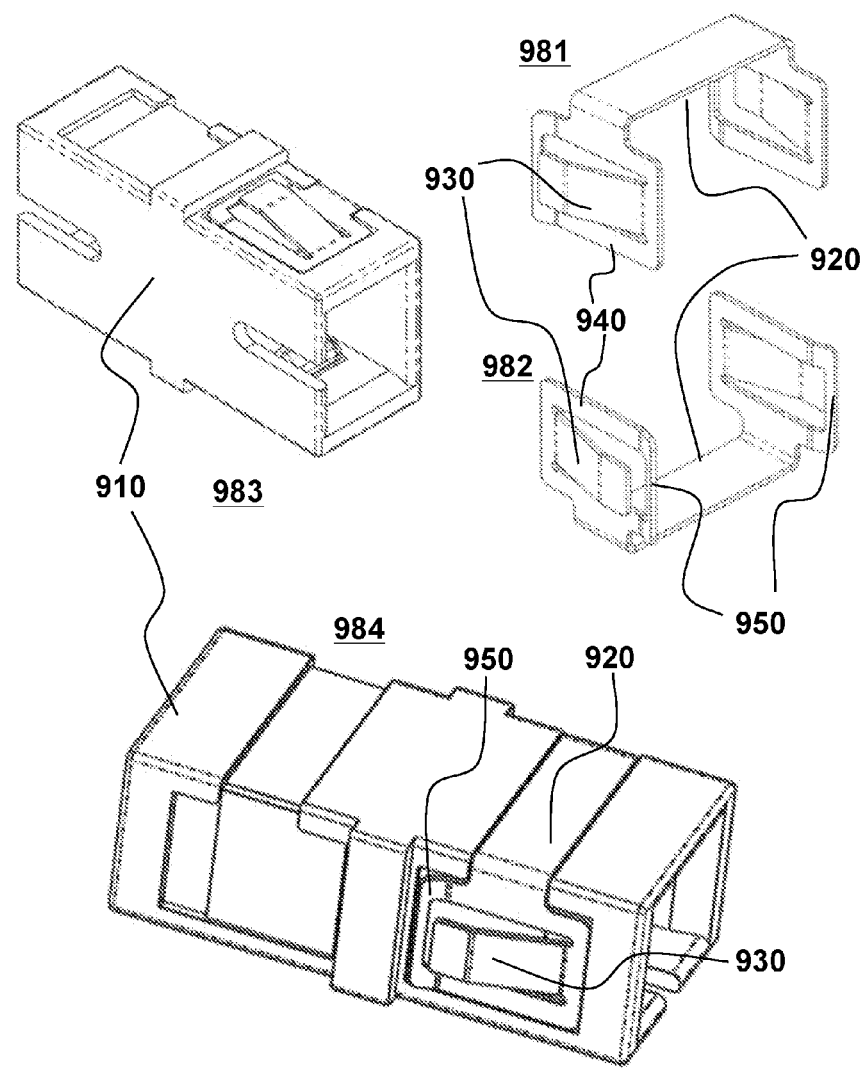
FIG. 9 shows a perspective view of a mount plate according to a second embodiment of the present invention before and after it is mounted on an optical adaptor.

FIG. 9 shows a perspective view of a mount plate according to a second embodiment of the present invention before and after it is mounted on an optical adaptor. The mount plate 920 of the second embodiment is shown in a normal position view 981 and an upside down view 982.

The mount plate 920 has a base 940 on each side. Each base 940 has a locking claw 930 protruding from the base 940 out of the mount plate 920. The end 950 of the base 940 that is closer to the opening end of the locking claw 930 is folded linearly upward away from the optical adaptor 910.

When mounted on the adapter housing 910 as shown in the perspective views 983 and 984, the mount plate 920 is received by the optical adapter 910 at its placement region.

Figure 10:
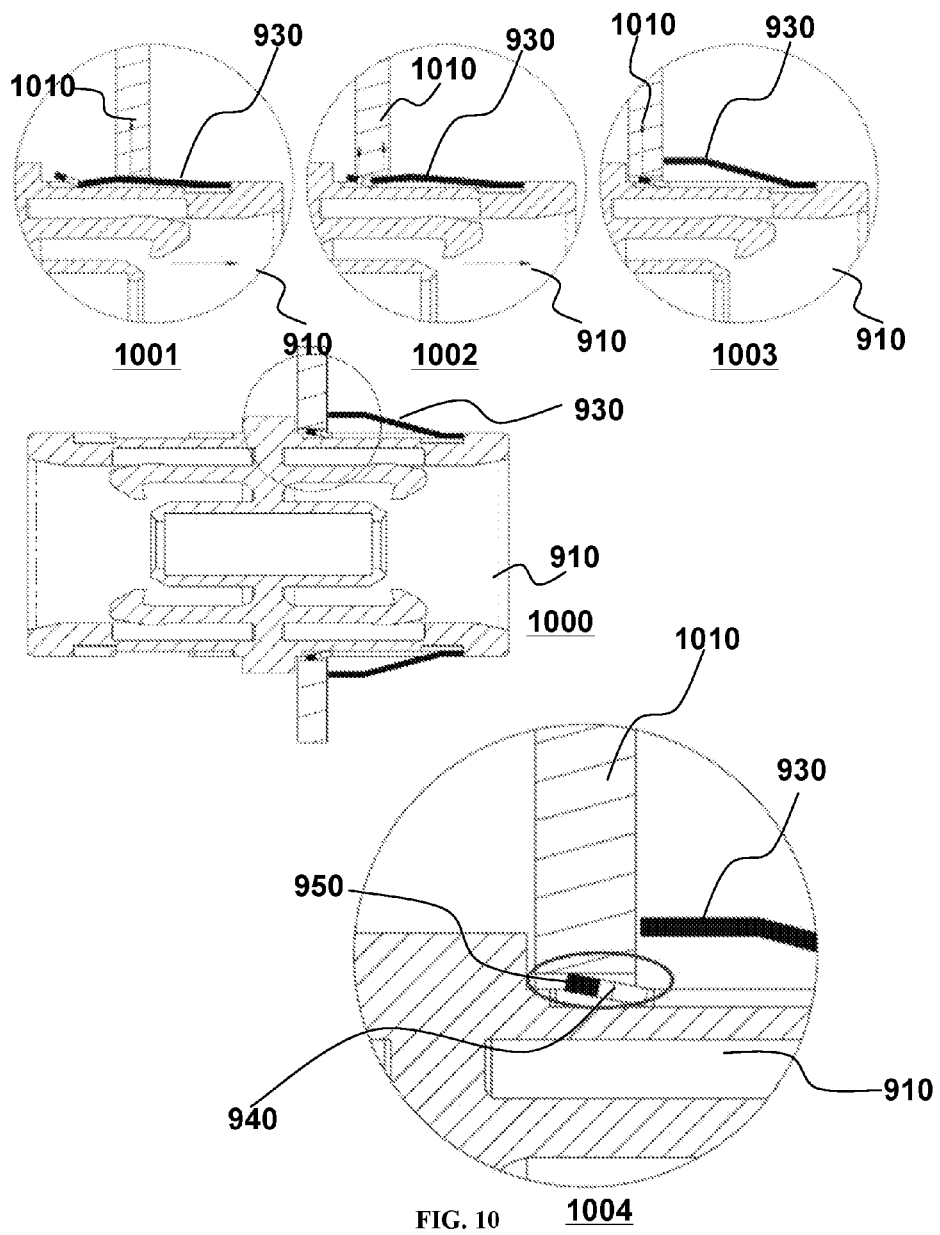
FIG. 10 shows a cross-sectional view of an optical adaptor being inserted into the hole of a connector panel.

FIG. 10 shows a cross-sectional view of an optical adaptor being inserted into the hole of a connector panel according to the second embodiment of the present invention. The cross-sectional view 1000 shows the adaptor housing 910 is fully inserted into the hole on the connector panel 1010. In order to illustrate how the mount plate 920 operates, the region around the hole of the connector panel 1010 is enlarged to better show the insertion of the adaptor housing 910 into the hole on the connector panel 1010 at different time instances.

The enlarged cross-sectional views 1001, 1002, and 1003 show the adaptor housing 910 is progressing through the connector panel hole. The locking claw 930 is flattened onto the adaptor housing 910 by the wall of the connector panel hole when the adaptor housing 910 is passing through the wall of the connector panel hole. After the adaptor housing 910 is fully inserted as shown by the enlarged cross-sectional view 1003, the locking claw 930 has its opening end crossed the wall of the connector panel hole and the opening end of the locking claw 930 returns to its initial floating position under its resilience force.

In the enlarged cross-sectional view 1004, it is shown that the adaptor housing 910 has been fully inserted into the connector panel hole. As shown by the enlarged cross-sectional view 1004, the whole locking claw 903 passes through the connector adaptor thickness 1010. The folded end 950 of the second embodiment of the mount plate 920 are pressed against the wall of the connector panel hole at the edge of the connector panel hole to fill the clearance, thus eliminating any rattling.

The advantages of this second embodiment of the mount plate 920 include:

(1) it has relatively lower manufacturing requirement because the manufacturing of this second embodiment takes relatively less form shaping procedures. The folding of the end 950 of the base 940 by linear shape forming is a comparatively easier process;

(2) the crease of the folded end 950 is uniform, linear, and occupies a large area of the base 940; this facilitates relatively high resilience of the folding, which translates to a stronger reaction force;

(3) this second embodiment provides the strongest reaction force from the mount plate 920 to the wall of the connector panel hole and offers a more rigid rattle-free feature; and (4) as more material is shape-formed (folded), this gives a stronger structure and provides relatively higher reaction force from mount plate to panel thickness.

Figure 11:
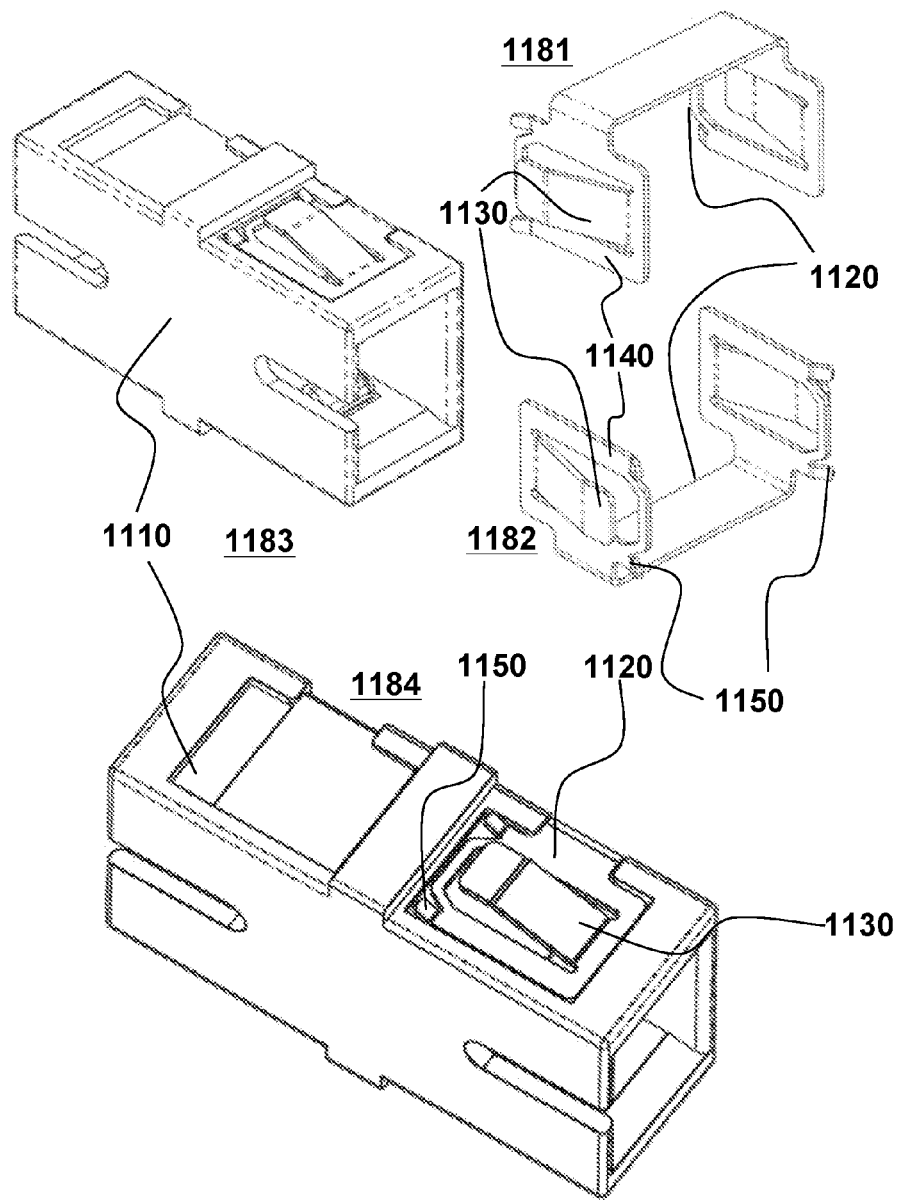
FIG. 11 shows a perspective view of a mount plate according to a third embodiment of the present invention before and after it is mounted on an optical adaptor.

FIG. 11 shows a perspective view of a mount plate according to a third embodiment of the present invention before and after it is mounted on an optical adaptor. The mount plate 1120 of the third embodiment is shown in a normal position view 1181 and an upside down view 1182.

The mount plate 1120 has a base 1140 on each side. Each base 1140 has a locking claw 1130 protruding from the base 1140 out of the mount plate 1120. The end of the base 1140 that are closer to the opening end of the locking claw 1130 is shaped to form two small tabs 1150 at the corners and the two tabs 1150 are folded slightly upward.

When mounted on the adapter housing 1110 as shown in the perspective views 1183 and 1184, the mount plate 1120 is received by the optical adapter 1110 at its placement region.

Figure 12:
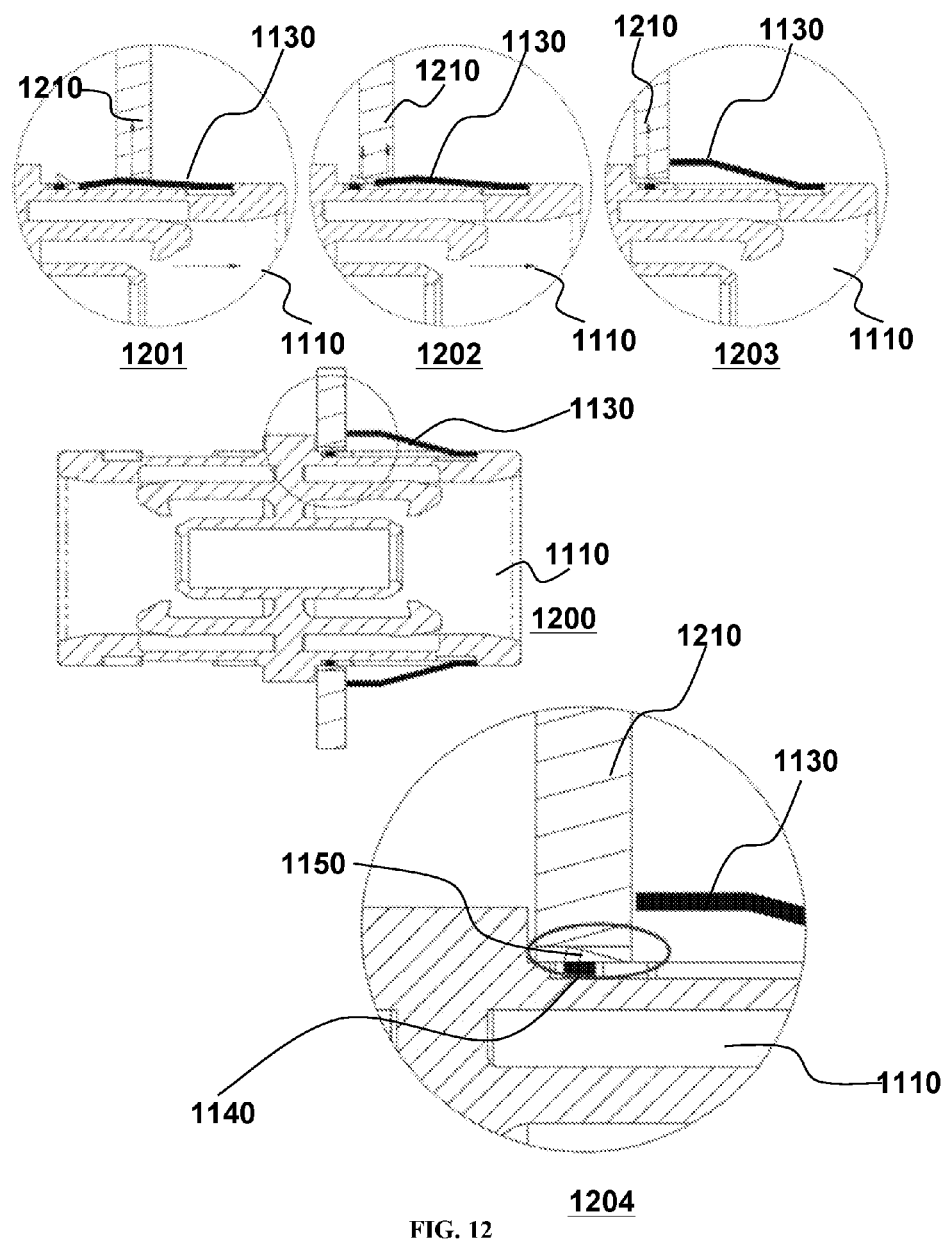
FIG. 12 shows a cross-sectional view of an optical adaptor being inserted into the hole of a connector panel according to the third embodiment of the present invention.

FIG. 12 shows a cross-sectional view of an optical adaptor being inserted into the hole of a connector panel according to the third embodiment of the present invention. The cross-sectional view 1200 shows the adaptor housing 1110 is fully inserted into the hole on the connector panel 1210. In order to illustrate how the mount plate 1120 operates, the region around the hole of the connector panel 1210 is enlarged to better show the insertion of the adaptor housing 1110 into the hole on the connector panel 1210 at different time instances.

The enlarged cross-sectional views 1201, 1202, and 1203 show the adaptor housing 1110 is progressing through the connector panel hole. The locking claw 1130 is flattened onto the adaptor housing 1110 by the wall of the connector panel hole when the adaptor housing 1110 is passing through the wall of the connector panel hole. After the adaptor housing 1110 is fully inserted as shown by the enlarged cross-sectional view 1203, the locking claw 1130 has its opening end crossed the wall of the connector panel hole and the opening end of the locking claw 1130 returns to its initial floating position under its resilience force.

In the enlarged cross-sectional view 1204, it is shown that the adaptor housing 1110 has been fully inserted into the connector panel hole. As shown by the enlarged cross-sectional view 1204, the whole locking claw 1103 passes through the connector adaptor thickness 1210. The two tabs 1150 of the third embodiment of the mount plate 1120 are pressed against the wall of the connector panel hole at the edge of the connector panel hole to fill the clearance, thus eliminating any rattling.

In the meantime, a part of the base 1140 remains leaning against the adaptor housing 1110 to hold the adaptor housing 1110 and provide additional support to the two folded corners 1150 when they are pressing against the wall of the connector panel hole.

The advantages of this third embodiment of the mount plate 1120 include:

(1) the pressure points on the wall of the connector panel hole at the edge of the connector panel hole are near the corners of the hole, thus the reaction force pressing on the wall of the connector panel hole at the edge of the connector panel hole is evenly distributed;

(2) the third embodiment has a relatively lower manufacturing requirement because of the relatively simpler linear folding for the tabs 1150 at the corner;

(3) since a large part the end of the base 1140 between the two tabs remain in contact of the adaptor housing 1110 in the fully inserted position, it provides extra stability to the mount plate 1120 on the adapter housing 1110; and (4) the tabs 1150 can fill up the clearance near corner of the connector panel hole, so this gives relatively even distribution of reaction force to the wall of the connector panel hole and enhances stability.

Figure 13:
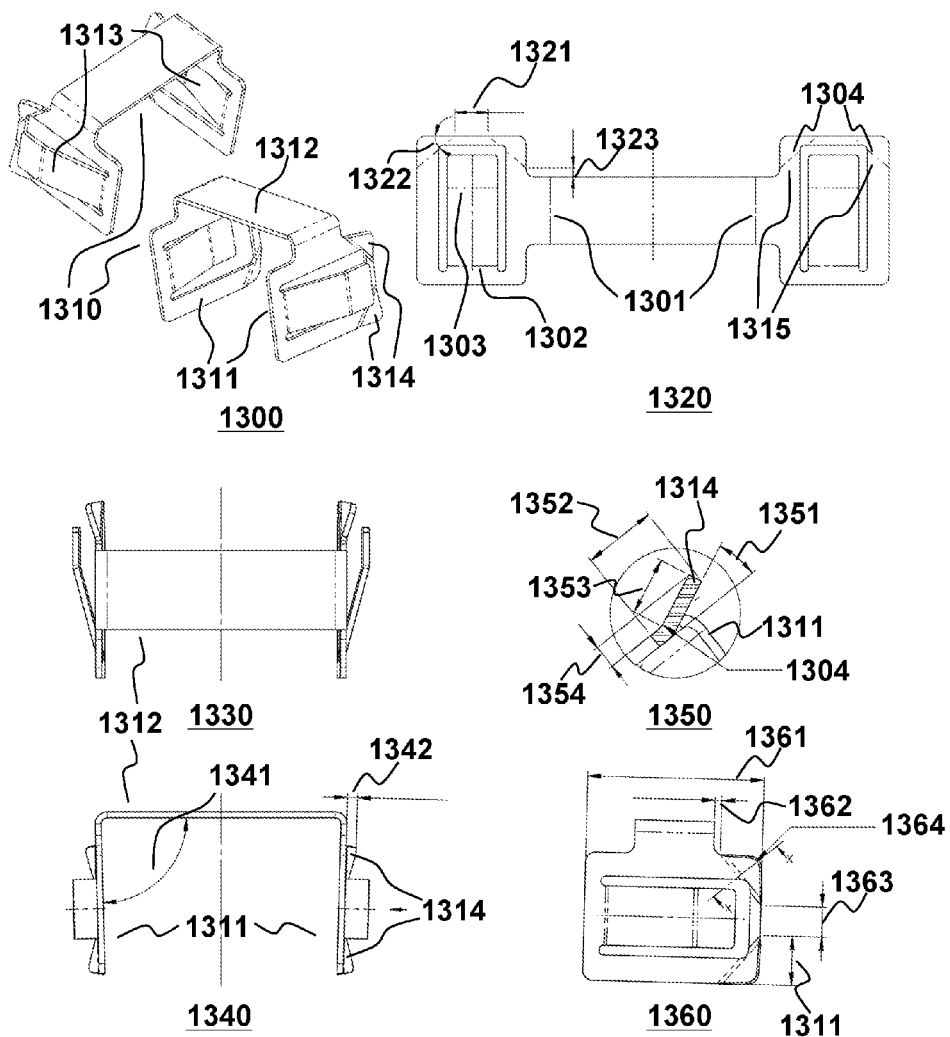
FIG. 13 shows various views of the mount plate according to the first embodiment of the present invention.

FIG. 13 shows various views of the mount plate according to the first embodiment of the present invention. Different perspective views 1300 of the mount plate 1310 are shown. The mount plate 1310 is to be installed onto a placement region of the housing of an optical adaptor. The mount plate 1310 is made from a metal sheet. The mount plate 1310 has a base 1311 at each side thereof. The two bases 1311 are bridged together by a bar 1312 as if the bar 1312 is hung across the two bases 1311.

Each base 1311 has a locking crawl 1313 stemming out of the middle section of a front end of the base 1311 and extending towards a back end of the base 1311 along the plane substantively parallel to the base 1311 and outside of the mount plate 1310. Each locking crawl 1313 has an opening end closer to the back end of the each base 1311. The corners 1314 of the back end of each base 1311 are folded up in a direction away from the bar 1312 and the other base 1311.

The mount plate 1310 is formed by folding or bending a flattened metal sheet 1320. The metal sheet 1320 is in a shape resembling a dumbbell. Two ends of the metal sheet 1320 are the bases 1311 of the mount plate 1310.

Along a first fold line 1301 on the bar 1312, the bases 1311 are folded down by around 91.5°.

For each of the bases 1311:

(1) along a second fold line 1302 on the locking crawl 1313 closer to the front end of the base 1311, the stemming end of the locking crawl 1311 is folded up by around 15°;

(2) along a third fold line 1303 on the locking crawl 1313 closer to the back end of the base 1311, the opening end of the locking crawl 1311 is folded down by around 15'; and (3) along a fourth fold line 1304 on the base 1311, each corner 1314 of the back end of the base 1311 is folded up by 24°, forming a triangle with a base angle 1322 of around 40° between the fourth fold line 1304 and the back end of the base 1311. By way of bending, the corners 1314 are folded up, forming an arc along the fourth fold line 1304 with an arc angle of 24° in a circle with a radius of 0.5 mm. The folded corners 1314 becomes the rattle-free feature of the mount plate 1310. The folded corners 1314, being in form of a flat plate, point away from the bar 1312.

After the two corners 1314 are folded up:

(1) a middle part of the back end of each base 1311 with a length 1321 of around 1.9 mm is left on the plane of the base 1311 between the folded corners 1314 of the back end of each base 1311; and (2) a pair of supporting tips 1315 are formed on the base 1311 on which the folded corners 1314 are erected. The pair of supporting tips 1315 extends in a direction towards the opening end of the locking claw 1313 of each of the bases 1311. Therefore, each fourth fold line 1304 becomes a front of each supporting tip 1315. Each supporting tip 1315 provides support to each folded corner 1314 for each folded corner 1314 to withstand the tightening force from the opening of the connector panel when each folded corner 1314 fill up the clearance between the adaptor housing and the opening of the connector panel. Each supporting tip 1315 is formed with a minimum length 1323 of 0.5 mm extending from the base 1311 beyond the intersection between the bar 1312 and the base 1311, i.e. from the said intersection to the fourth fold line 1304. Each corner 1314 is in shape of a triangle using its hypotenuse to erect on the supporting tip 1315.

FIG. 13 also shows the top view 1330 of the mount plate 1310 and the front view 1340 of the mount plate 1310. As shown in the front view 1340, the angle 1341 between the base 1311 and the bar 1312 is around 85.5°-91.5°, preferably 88.5°. Furthermore, the corners 1314 are folded upward from the base 1311, the maximum distance 1342 in the normal direction from the base 1311 to each corner 1314 is around 0.45 mm-0.55 mm, preferably 0.5 mm.

The right-side view 1360 of the front view 1340 is also shown in FIG. 13. FIG. 13 further shows the cross-sectional view 1350 along the line XX in the right-side view 1360. The line XX cuts along the normal from the fourth fold line 1304 to the tip of the corner 1314. The length 1353 of the normal from the fourth fold line 1304 to the tip of the corner 1314 is around 1.23 mm.

In the cross-sectional view 1350, the angle 1351 between the folded corner 1314 and the base 1311 is around 24°. The preferred distance 1354 in the normal direction from the base 1311 to the corner 1314 is around 0.5 mm. The length 1352 of the corner 1314 being folded up by bending along the cross section XX is 1.54 mm-1.56 mm, preferably 1.55 mm.

In the right-side view 1360, the width 1361 of the base 1311 is around 8.7 mm-9.1 mm, preferably 8.9 mm. The shortest distance 1362 between the bar 1312 and the fourth fold line 1304 along which the upper corner of each base 1311 is folded is around 0.33 mm-0.35 mm, preferably 0.34 mm. The shortest distance 1363 between the fourth fold lines along the back end of each base 1311 is around 1.51 mm-1.53 mm, preferably 1.52 mm. The lower corner 1314 of the base 1311 is folded up along the fourth fold line 1304, which has a length of 2.49 mm along the back end of the bases 1311. Each corner 1314 of the base 1311 has a tip 1364 which is in shape of a 90° arc in a circle with a radius of 0.5 mm.

Figure 14:
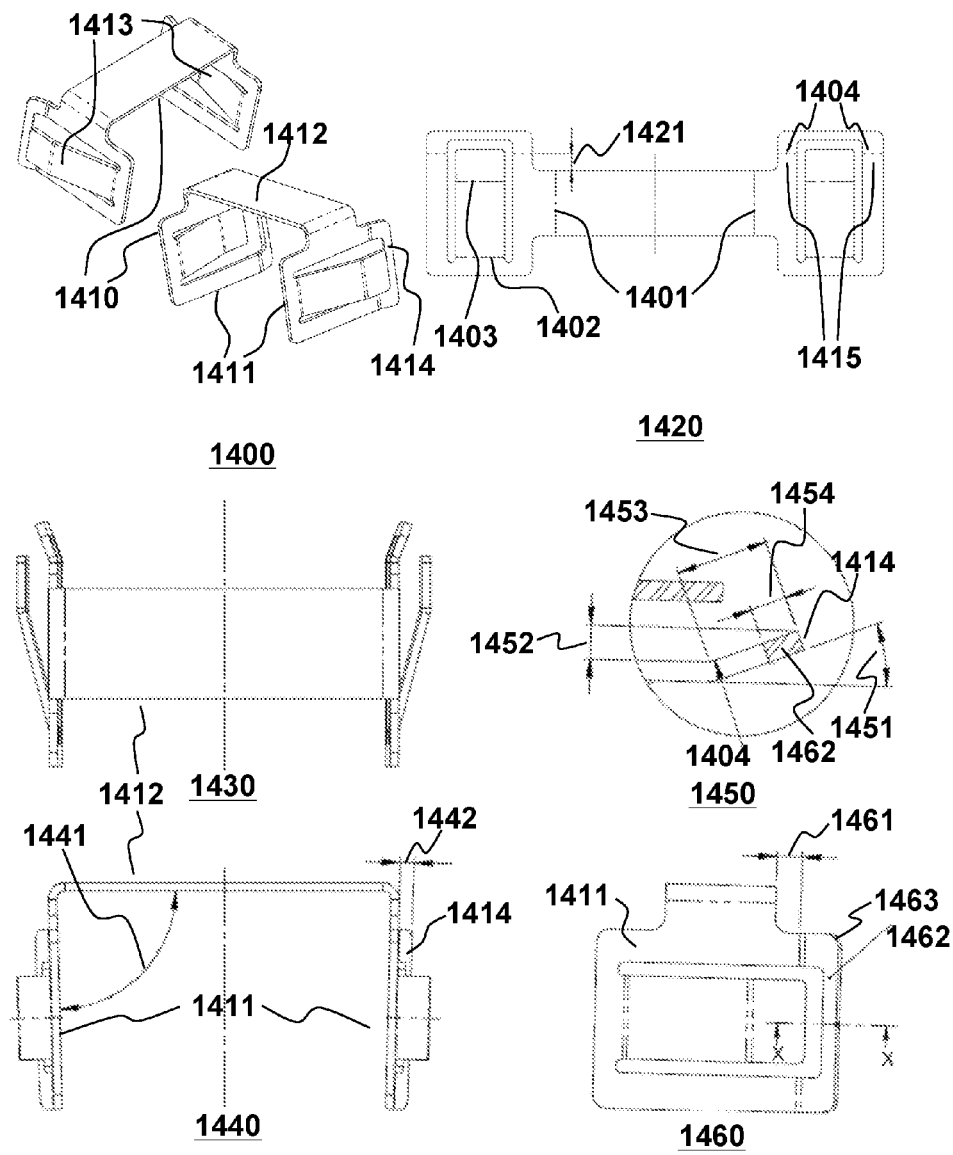
FIG. 14 shows various views of the mount plate according to the second embodiment of the present invention.

FIG. 14 shows various views of the mount plate according to the second embodiment of the present invention. Different perspective views 1400 of the mount plate 1410 are shown. The mount plate 1410 is to be installed onto a placement region of the housing of an optical adaptor. The mount plate 1410 is made from a metal sheet. The mount plate 1410 has a base 1411 at each side thereof. The two bases 1411 are bridged together by a bar 1412 as if the bar 1412 is hung across the two bases 1411.

Each base 1411 has a locking crawl 1413 stemming out of the middle section of a front end of the base 1411 and extending towards a back end 1414 of the base 1411 along the plane substantively parallel to the base 1411 and outside of the mount plate 1410. Each locking crawl 1413 has an opening end closer to the back end 1414 of the base 1411. The back end 1414 of each base 1411 is folded up in a direction away from the bar 1412 and the other base 1411.

The mount plate 1410 is formed by folding or bending a flattened metal sheet 1420. The metal sheet 1420 is in a shape resembling a dumbbell. Two ends of the metal sheet 1420 are the bases 1411 of the mount plate 1410.

Along a first fold line 1401 on the bar 1412, the bases 1411 are folded down by around 91.5°.

For each of the bases 1411:

(1) along a second fold line 1402 on the locking crawl 1413 closer to the front end of the base 1411, the stemming end of the locking crawl 1411 is folded up by around 15°;

(2) along a third fold line 1403 on the locking crawl 1413 closer to the back end 1414 of the base 1411, the opening end of the locking crawl 1411 is folded down by around 15°; and (3) along a fourth fold line 1404 on the base 1411, the back end 1414 of the base 1411 is folded up by 21°. By way of bending, the back ends 1314 are folded up, forming an arc along the fourth fold line 1404 with an arc angle of 21° in a circle with a radius of 0.5 mm. The back end 1414 becomes the rattle-free feature of the mount plate 1410. The back end 1414, being in form of a flat plate, point away from the bar 1412.

After the back end 1414 of each base 1411 is folded up, a pair of supporting tips 1415 are formed on the base 1411 on which the back end 1414 is erected. The pair of supporting tips 1415 extend in a direction towards the opening end of the locking claw 1413 of each of the bases 1411. Therefore, each fourth fold line 1404 becomes a front of each supporting tip 1415. Each supporting tip 1415 provides support to the back end 1414 for the folded back end 1414 to withstand the tightening force from the opening of the connector panel when the folded back end 1414 fills up the clearance between the adaptor housing and the opening of the connector panel. Each supporting tip 1415 is formed with a minimum length 1421 of 1.03 mm extending from the base 1411 beyond the intersection between the bar 1412 and the base 1411, i.e. from the said intersection to the fourth fold line 1404. The back end 1414 is in shape of a rectangular plate using one of its end to joining the two supporting tips 1415.

FIG. 14 also shows the top view 1430 of the mount plate 1410 and the front view 1440 of the mount plate 1410. As shown in the front view 1440, the angle 1441 between the base 1411 and the bar 1412 is around 85.5°-91.5°, preferably 88.5°. Furthermore, the back end 1414 are folded upward from the base 1411, the maximum distance 1442 in the normal direction from the base 1411 to the back end 1414 is around 0.45 mm-0.55 mm, preferably 0.5 mm.

The right-side view 1460 of the front view 1440 is also shown in FIG. 14. FIG. 14 further shows the cross-sectional view 1450 along the line XX in the right-side view 1460. The line XX cuts along the midpoint of the back end 1414.

In the cross-sectional view 1450, the angle 1451 between the folded back end 1414 and the base 1411 is around 21°. The preferred distance 1452 in the normal direction from the base 1411 to the folded back end 1414 is around 0.5 mm. The length 1453 of the back end 1414 being folded up by bending, i.e. the length from the fourth fold line 1404 to the edge of the back end 1414, is 1.39 mm-1.41 mm, preferably 1.40 mm. The back end 1414 has a shorter length 1454 of around 0.55 mm along its middle section 1462.

In the right-side view 1460, the shortest distance 1461 between the bar 1412 and the fourth fold line 1404 along which the back end of each base 1411 is folded is around 0.81 mm-1.01 mm, preferably 0.91 mm. Each corner 1414 of the base 1411 has a tip 1463 which is in shape of a 90° arc in a circle with a radius of 0.5 mm.

Figure 15:
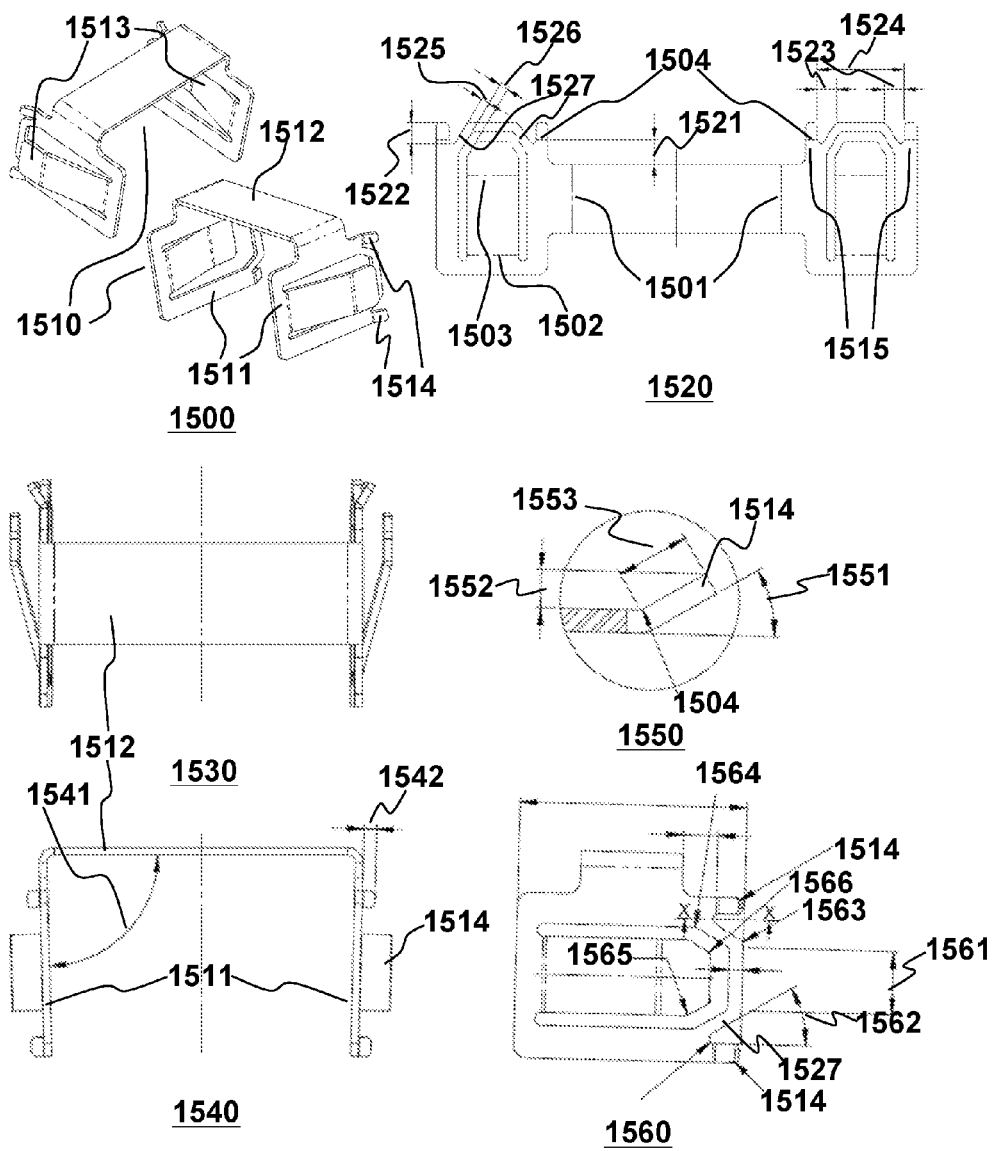
FIG. 15 shows various views of the mount plate according to the third embodiment of the present invention.

FIG. 15 shows various views of the mount plate according to the third embodiment of the present invention. Different perspective views 1500 of the mount plate 1510 are shown. The mount plate 1510 is to be installed onto a placement region of the housing of an optical adaptor. The mount plate 1510 is made from a metal sheet. The mount plate 1510 has a base 1511 at each side thereof. The two bases 1511 are bridged together by a bar 1512 as if the bar 1512 is hung across the two bases 1511.

Each base 1511 has a locking crawl 1513 stemming out of the middle section of a front end of the base 1511 and extending towards a back end of the base 1511 along the plane substantively parallel to the base 1511 and outside of the mount plate 1510. Each locking crawl 1513 has an opening end closer to the back end of the base 1511. Each tab 1514 at the corner of the back end of each base 1511 is folded up in a direction away from the bar 1512 and the other base 1511.

The mount plate 1520 is formed by folding or bending a flattened metal sheet 1520. The metal sheet 1520 is in a shape resembling a dumbbell. Two ends of the metal sheet 1520 are the bases 1511 of the mount plate 1510.

Along a first fold line 1501 on the bar 1512, the bases 1511 are folded down by around 91.5°.

For each of the bases 1511:

(1) along a second fold line 1502 on the locking crawl 1513 closer to the front end of the base 1511, the stemming end of the locking crawl 1511 is folded up by around 15°; and (2) along a third fold line 1503 on the locking crawl 1513 closer to the back end of the base 1511, the opening end of the locking crawl 1511 is folded down by around 15°.

To facilitate bending of the metal sheet to form the locking crawl 1513 and separate the locking crawl 1513 from the metal sheet, a gap with a width 1526 of 0.5 mm is formed along the periphery of the locking crawl 1513.

(3) Along a fourth fold line 1504 on the base 1511, the tab 1514 at the corner of the back end of the base 1511 is folded up by 31°. By way of bending, the tabs 1514 are folded up, forming an arc along the fourth fold line 1504 with an arc angle of 31° in a circle with a radius of 0.2 mm. The tabs 1514 become the rattle-free features of the mount plate 1510. The tab 1514, being in form of a flat plate, point away from the bar 1512.

In one embodiment, each tab 1514 is initially part of the corner of the back end of the base 1511. The tabs 1514 are formed by cutting parts of the back end of the base 1511 away and leaving between each tab 1514 and the middle part of the back end of the base 1511 a cavity with a length 1523 of 1.1 mm at the opening of the cavity. The cavity diminishes when it gets more inward into the base 1511 so that the gap between the tab 1514 and the middle part of the back end of the base 1511 closes at the distance 1522 of 1.23 mm from the edge of the back end of the base 1511.

The distance 1524 between the sides of the tabs 1514 adjacent to the cavity is 5.0-5.2 mm, preferably 5.1 mm.

After the tabs 1514 of each base 1511 are folded up:

(1) A middle part of the back end of each base 1511 is left on the plane of the base 1511 between the tabs 1514 of the back end of each base 1511.

(2) A pair of supporting tips 1515 are formed on the base 1511 on which the tabs 1514 are erected. Therefore, each fourth fold line 1504 becomes a front of each supporting tip 1515. The pair of supporting tips 1515 extend in a direction towards the opening end of the locking claw 1513 of each of the bases 1511. Each supporting tip 1515 provides support to each tab 1514 for each tab 1514 to withstand the tightening force from the opening of the connector panel when each tab 1514 fill up the clearance between the adaptor housing and the opening of the connector panel. Each supporting tip 1515 is formed with a minimum length 1521 of 1.44 mm extending from the base 1511 beyond the intersection between the bar 1512 and the base 1511, i.e. from the said intersection to the fourth fold line 1504. The tab 1514 is in shape of a rectangular plate using one of its end to erect on the supporting tip 1515.

The middle part of the back end of the base 1511 remains attached to the base 1511 through an arm 1527 with a width 1525 of 0.5 mm at each side of the middle part of the back end of the base 1511.

FIG. 15 also shows the top view 1530 of the mount plate 1510 and the front view 1540 of the mount plate 1510. As shown in the front view 1540, the angle 1541 between the base 1511 and the bar 1512 is around 85.5°-91.5°, preferably 88.5°. Furthermore, the tabs 1514 are folded upward from the base 1511, the maximum distance 1542 in the normal direction from the base 1511 to each tab 1514 is around 0.45 mm-0.55 mm, preferably 0.5 mm.

The right-side view 1560 of the front view 1540 is also shown in FIG. 15. FIG. 15 further shows the cross-sectional view 1550 along the line XX in the right-side view 1560. The line XX cuts along the region where the arm 1527 of the middle part of the back end of the base 1511 joins the supporting tip 1515.

In the cross-sectional view 1550, the angle 1551 between the tab 1514 and the base 1511 is around 31°. The preferred distance 1552 in the normal direction from the base 1311 to the tab 1514 is around 0.5 mm. The length 1553 of the corner 1514 being folded up by bending along the cross section XX is 0.97 mm.

In the right-side view 1560, the width 1561 of the middle part of the back end of the base 1511 is around 2.48 mm. The arm 1527 of the middle part of the back end of the base 1511 and the tab 1514 forms an angle of 31°. The junction between the arm 1527 of the middle part of the back end of the base 1511 and the tab 1514 is in a shape of an arc in a circle with a radius of 0.22 mm.

The middle part of the back end of the base 1511 has a corner on its each side in a shape of an arc in a circle with a radius of 0.4 mm. The tip of the tab 1514 is in a shape of an arc in a circle with a radius of 0.3 mm.

The opening end of the locking claw 1513 has a first corner 1565, which is in a shape of an arc in a circle with a radius of 0.5 mm and a second corner 1566, which is in a shape of an arc in a circle with a radius of 0.3 mm. While the corners 1564 formed by the gap along the boundary of the locking claw 1513 are in a shape of an arc in a circle with a radius of 0.3 mm.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A mount plate for an optical adaptor, comprising:
   a first base and a second base which are bridged by a bar;
   a locking claw stemming out of a middle section of each of the first base and the second base such that each locking claw has one end connected with the respective base thereof and another end being an opening end;
   at least two supporting tips extending in a direction towards the opening end of each locking claw from each of the first base and the second base beyond an intersection between the bar and each of the first base and the second base; and
   one or more rattle-free features pointing away from the bar, each of the rattle-free features being erected at each of the supporting tips such that each of the rattle-free features forms an acute angle with the respective supporting tip thereof, wherein each of the rattle-free features is a flat plate; and
   a clamping plate joining the one or more rattle-free features and providing a stand for each of the rattle-free features such that the clamping plate is pressed by the rattle-free feature when the rattle-free feature is pressed.

2. The mount plate of claim 1, wherein:
the supporting tip extends beyond the intersection by a length of at least 0.5 mm.

3. The mount plate of claim 2, wherein:
each of the rattle-free features is in shape of a triangle using a hypotenuse thereof to erect on the supporting tip.

4. The mount plate of claim 3, wherein:
the acute angle is approximately 24°.

5. The mount plate of claim 4, wherein:
the clamping plate has a minimum length of 1.51 mm for joining two of the rattle-free features.

6. The mount plate of claim 1, wherein: each supporting tip extends beyond the intersection by a length of at least 1.44 mm.

7. The mount plate of claim 6, wherein:
each of the rattle-free features is in shape of a rectangular plate using one end thereof to erect on the respective supporting tip.

8. The mount plate of claim 6, wherein:
the acute angle is approximately 31°.

9. The mount plate of claim 7, wherein:
the clamping plate has a minimum length of 2.48 mm for joining two of the rattle-free features.

10. The mount plate of claim 1, wherein:
each of the supporting tips extends beyond the intersection by a length of at least 1.03 mm.

11. The mount plate of claim 10, wherein:
the rattle-free feature is in shape of a rectangular plate with one end joining two of the supporting tips.

12. The mount plate of claim 11, wherein:
the acute angle is approximately 21°.

13. The mount plate of claim 1, wherein:
the first base and the second base extend in a direction towards each other such that an angle between the bar and each of the first base and the second base is 88.5° respectively.

14. An optical adaptor with the mount plate of claim 1, comprising:
a housing; and
the mount plate of claim 1 installed onto a placement region of the housing.

15. The optical adaptor of claim 14, wherein:
each of the rattle-free features is in shape of a rectangular plate using one end thereof to erect on the respective supporting tip.

16. The optical adaptor of claim 15, wherein:
the acute angle is 31°.

17. The optical adaptor of claim 16, wherein:
the clamping plate has a minimum length of 2.48 mm for joining two of the rattle-free features.

18. The optical adaptor of claim 17, wherein:
the first base and the second base extend in a direction towards each other such that an angle between the bar and each of the first base and the second base is approximately 88.5° respectively.

19. The optical adaptor of claim 18, wherein:
the mount plate is made from a metal sheet.

* * * * *